US010706103B2

(12) United States Patent
Agarwal et al.

(10) Patent No.: US 10,706,103 B2
(45) Date of Patent: Jul. 7, 2020

(54) SYSTEM AND METHOD FOR HIERARCHICAL DISTRIBUTED PROCESSING OF LARGE BIPARTITE GRAPHS

(71) Applicant: Microsoft Technology Licensing, LLC, Redmond, WA (US)

(72) Inventors: Manoj Kumar Agarwal, Hyderabad (IN); Rohit Jain, Hyderabad (IN); Amey Satish Gade, Jalgaon (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 187 days.

(21) Appl. No.: 15/883,251

(22) Filed: Jan. 30, 2018

(65) Prior Publication Data

US 2019/0236215 A1 Aug. 1, 2019

(51) Int. Cl.
*G06F 17/00* (2019.01)
*G06F 16/901* (2019.01)
*G06F 7/14* (2006.01)

(52) U.S. Cl.
CPC .......... *G06F 16/9024* (2019.01); *G06F 7/14* (2013.01); *G06F 16/9014* (2019.01)

(58) Field of Classification Search
CPC .............. G06F 16/3325; G06F 16/951; G06F 16/2425; G06F 16/2465; G06F 16/285; G06F 16/332
See application file for complete search history.

(56) References Cited

U.S. PATENT DOCUMENTS

| 6,701,309 | B1 | 3/2004 | Beeferman et al. |
| 7,051,023 | B2 | 5/2006 | Kapur et al. |
| 8,380,723 | B2 | 2/2013 | Radlinski et al. |
| 8,396,884 | B2 | 3/2013 | Singh et al. |
| 8,922,559 | B2 | 12/2014 | Charles et al. |
| 9,330,165 | B2 | 5/2016 | Jiang et al. |
| 2011/0208730 | A1 | 8/2011 | Jiang et al. |
| 2012/0239810 | A1* | 9/2012 | Mueller ............... G06F 9/5061 709/226 |

(Continued)

OTHER PUBLICATIONS

Huang, et al., "Relevant Term Suggestion in Interactive Web Search Based on Contextual Information in Query Session Logs", In Journal of American Society for Information Science and Technology, vol. 54, Issue 7, May 2003, pp. 639-649.

(Continued)

*Primary Examiner* — Truong V Vo
(74) *Attorney, Agent, or Firm* — Alleman Hall Creasman & Tuttle LLP (57) ABSTRACT

Systems, methods, and apparatuses for implementing a distributed, hierarchical, and iterative data graph processing strategy are disclosed. A large data graph is partitioned and the partitions are clustered. Sets of keys and hashes are generated for each cluster and distributed to a plurality of processing machines. The processing machines recreate the partitions, based on received hashes and keys of the clusters of the first partitions, and the graph. Thereafter, the partitioning, clustering and processing is repeatable for the recreated graphs. The disclosed strategy enables processing of large and dynamic data graphs, including bipartite query-Uniform Resource Locator graphs.

19 Claims, 7 Drawing Sheets

(56) References Cited

U.S. PATENT DOCUMENTS

2016/0210301 A1    7/2016    Jiang et al.
2018/0060915 A1*   3/2018    Liu .................... G06Q 30/0269

OTHER PUBLICATIONS

Li, et al., "Scalable Sequential Spectral Clustering", In Proceedings of Thirtieth AAAI Conference on Artificial Intelligence, Feb. 12, 2016, pp. 1809-1815.

Liao, et al., "Mining Concept Sequences from Large-Scale Search Logs for Context-Aware Query Suggestion", In ACM Transactions on Intelligent Systems and Technology, vol. 3, Issue 1, Article No. 17, Oct. 2011, 40 Pages.

Liu, et al., "Large-Scale Spectral Clustering on Graphs", In Proceedings of 23rd International Joint Conference on Artiticial Intelligence, Aug. 3, 2013, pp. 1486-1492.

Sadikov, et al., "Clustering Query Refinements by User Intent", In Proceedings of 19th International Conference on World Wide Web, Apr. 26, 2010, 10 Pages.

Yang, et al., "A Divide and Conquer Framework for Distributed Graph Clustering", In Proceedings of 32nd International Conference on Machine Learning, Jul. 6, 2015, 10 Pages.

Yoo, et al., "Streaming Spectral Clustering", In Proceedings of IEEE 32th International Conference on Data Engineering, May 16, 2016, 12 Pages.

Yu, et al., "Fast Incremental SimRank on Link-Evolving Graphs", In Proceedings of IEEE 30th International Conference on Data Engineering, Mar. 31, 2017, pp. 1-12.

Yu, et al., "Random Walk with Restart over Dynamic Graphs", In Proceedings of IEEE 16th International Conference on Data Mining, Dec. 12, 2016, 10 Pages.

Zhao, Peixiang, "gSparsify: Graph Motif Based Sparsification for Graph Clustering", In Proceedings of 24th ACM International Conference on Information and Knowledge Management, Oct. 19, 2015, 10 Pages.

\* cited by examiner

SYSTEM AND METHOD FOR HIERARCHICAL DISTRIBUTED PROCESSING OF LARGE BIPARTITE GRAPHS

BACKGROUND

The widespread availability of computer networks provides access to vast quantities of information. Computer networks, such as the Internet, can potentially connect a computer user, for example, to any of numerous sources of information. Consequently, people can obtain information about any number of topics of interest, including products, services, events, people, and concepts.

A conventional approach to access information over a computer network is to use an information retrieval system, such as a web search system or search engine. A web search system develops an index of items conveying information that is available over a computer network in advance of a user's request for information. The items are formatted so that they convey information when requested by a computer user. The items, for example, may be files containing information or web pages that can be accessed over the computer network. When the search engine receives a query, representing a user's request for information about a topic, the search engine selects one or more items by matching items in the index to the search query and provides the items to the user.

Web search systems have been configured to employ various strategies to provide relevant search results, so as to reduce the burden on users to generate succinct, effective search queries. One approach has been to enable search engines to engage in query recommendation or suggestion. This approach involves large data graphs that store data (as nodes) and rules that describe knowledge about the data. These data graphs can be bipartite, meaning that the nodes in the graph can be divided into two disjoint sets, with all edges going between the two sets. Bipartite graphs can be generated for use in web usage mining, which extracts implicit knowledge from data that capture user interactions with the world wide web. In this way, they enable formulations of query recommendations or suggestions.

The subject matter discussed in this Background should not be assumed to be prior art merely as a result of its mention in this section. Similarly, a problem mentioned in this Background or associated with the subject matter of the background section should not be assumed to have been previously recognized in the prior art.

BRIEF SUMMARY

This Brief Summary is provided to introduce a selection of concepts in simplified form. It is intended to provide basic understandings of some aspects of the disclosed, innovative subject matter. Its sole purpose is to present some concepts in a simplified form as a prelude to the more detailed description that is presented later. The introduced concepts are further described below in the Description.

This Brief Summary is not an extensive overview of the disclosed, innovative subject matter. Also, it is neither intended to identify "key," "necessary," or "essential" features of the claimed subject matter nor is it intended to limit the scope of the claimed subject matter.

Innovations described herein generally pertain to strategies for the efficient and effective processing of large graphs, such as large bipartite graphs, in a manner that is distributed, hierarchical, and incremental. Such processing offers efficient processing of even large data graphs. This processing, in turn, promotes more responsive and efficient mining of the data contained in the graphs by, for example, providing efficient and robust identifications of instances of similarity in query-URL bipartite graphs.

Innovations described herein generally pertain to strategies for effective and efficient decomposition and reformulation of graph data, and make it possible to process graphs, particularly large bipartite graphs, efficiently.

Innovations described herein generally pertain to strategies for resolving improved query recommendations for search engines and Web search software by providing improved data graph processing that can improve the accuracy and effectiveness of the conventional query-term based query recommendation systems.

Innovations described herein provide search suggestions in response to receiving a portion of a search query. More particularly, each search suggestion may be a suggested search query that relates to or includes (e.g., completes or corrects) the portion of the search query. Thus, the term "suggestion," "search suggestion," "suggested search query," "query completion," "suggested search query completion," and "query completion suggestion" may be used interchangeably.

According to an aspect of the present invention, there is provided a method of processing a graph. The method involves the following operations: partitioning a bipartite graph into a plurality of first partitions; generating one or more clusters of nodes of each first partition; generating a set of keys for each cluster of nodes of each first partition, each key being based on similarities between nodes of the cluster for which the key was generated; encoding each cluster of nodes of each first partition with a hash; distributing the hashes and the keys to processing machines of a network, based on the keys; recreating, at the processing machines, both the first partitions, based on received hashes and keys of the clusters of the first partitions, and the bipartite graph; partitioning, at the processing machines, the recreated bipartite graphs into second partitions; generating one or more clusters of nodes of each second partition; generating a set of keys for each cluster of nodes of each second partition, each key being based on similarities between nodes of the cluster for which the key was generated; encoding each cluster of nodes of each second partition with a hash; recreating, at the processing machines, the second partitions, based on the hashes and keys of the clusters of the second partitions; and merging the recreated second partitions using a hierarchical merge process to yield a recreated bipartite graph.

According to an aspect of the present invention, there is provided a method of processing a graph. The method involves the following operations: dividing an input graph of nodes into a plurality of first type subgraphs; generating one or more first type clusters for each first type subgraph; distributing, to computing machines of a network, first type hashes and first type keys for each first type cluster, the first type keys being based on similarities between nodes of the first type cluster; recreating, at the computing machines, the first type subgraphs, based on the received first type hashes and first type keys; and recreating, at the computing machines, the input graph, based on the recreated first type subgraphs. Additionally, at the computing machines: dividing the recreated input graphs to yield second type subgraphs; generating one or more second type clusters for each second type subgraph; generating a second type key for each second type cluster, the second type keys being based on similarities between nodes of the second type cluster; encoding each second type cluster with a hash; recreating both the second type subgraphs, based on the second type hashes and second type keys, and the input graph, based on the recreated second type partitions. Lastly, the method includes merging the recreated second partitions using a hierarchical merge process to yield a recreated bipartite graph.

According to still another aspect of the present invention, there is provided a graph processing system. The system includes: a first computing machine; and a group of one or more second computing machines. The first computing machine divides an input graph of nodes into a plurality of first order subgraphs, generates one or more first order clusters for each first order subgraph, and distributes first order hashes and sets of first order keys for each first order cluster, the first order keys being based on similarities between nodes of the first order cluster. The group of one or more second computing machines recreate the first order subgraphs, based on the received first order hashes and first order keys distributed from the first computing machine, recreate the input graph, based on the recreated first order subgraphs, divide the recreated input graphs to yield second order subgraphs, generate one or more second order clusters for each second order subgraph, generate a second order key for each second order cluster, the second order keys being based on similarities between nodes of the second order cluster, encode each second order cluster with a hash, and recreate both the second order subgraphs, based on the second order hashes and second order keys, and the input graph, based on the recreated second order partitions.

According to yet another embodiment of the present invention, a graph processing method is provided. The method includes: dividing an input graph of nodes into a plurality of first order subgraphs; generating one or more first order clusters for each first order subgraph; distributing first order hashes and first order keys for each first order cluster, the first order keys being based on similarities between nodes of the first order cluster; recreating the first order subgraphs, based on the received first order hashes and first order keys; and recreating the input graph, based on the recreated first order subgraphs. The method also includes processing a recreated input graph by: dividing the recreated input graphs to yield next order subgraphs; generating one or more second order clusters for each next order subgraph; generating a next order key for each next order cluster, the next order keys being based on similarities between nodes of the next order cluster; encoding each next order cluster with a hash; and recreating both the next order subgraphs, based on the next order hashes and next order keys, and the input graph, based on the recreated next order partitions. Still further, the method includes merging the recreated next partitions using a hierarchical merge process to yield a recreated bipartite graph.

Furthermore, the present invention may be embodied as a computer system, as any individual component of such a computer system, as a process performed by such a computer system or any individual component of such a computer system, or as an article of manufacture including computer storage with computer program instructions and which, when processed by computers, configure those computers to provide such a computer system or any individual component of such a computer system. The computer system may be a distributed computer system. The present invention may also be embodied as software or processing instructions.

These, additional, and/or other aspects and/or advantages of the present invention are: set forth in the detailed description which follows; possibly inferable from the detailed description; and/or learnable by practice of the present invention. So, to the accomplishment of the foregoing and related ends, certain illustrative aspects of the claimed subject matter are described herein in connection with the following description and the annexed drawings. These aspects are indicative of various ways in which the subject matter may be practiced, all of which are within the scope of the claimed subject matter. Other advantages, applications, and novel features may become apparent from the following detailed description when considered in conjunction with the drawings.

BRIEF DESCRIPTION OF THE DRAWINGS

The accompanying drawings, which are incorporated herein and form part of the specification, illustrate aspects of the present invention and, together with the description, further serve to explain principles of the present invention and to enable a person skilled in the relevant art(s) to make and use the invention. These aspects are consistent with at least one embodiment of the present invention.

DESCRIPTION

I. Introduction and Lexicography

Preliminarily, some of the figures describe one or concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the actual use of corresponding distinct components. Additionally, or alternatively, any single component illustrated in the figures may be implemented by plural components. Additionally, or alternatively, the depiction of any two or more separate components in the figures may reflect different functions performed by a single component.

Others of the figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

The various aspects of the inventors' innovative discoveries are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

As to terminology, the phrase "configured to" is both contemplated and to be understood to encompass any way that any kind of functionality can be constructed to perform an identified operation. The functionality can be configured to perform an operation using, for instance, software, hardware (e.g., discrete logic components, etc.), firmware etc., or any combination thereof.

The term "logic" is both contemplated and to be understood to encompass any functionality for performing a task. For instance, each operation illustrated in the flowcharts corresponds to logic for performing that operation. An operation can be performed using, for instance, software, hardware (e.g., discrete logic components, etc.), firmware, etc., or any combination thereof. So, references to logic include references components, engines, and devices.

The term "computing device" is both contemplated and to be understood to encompass any processor-based electronic device that is capable of executing processing instructions to provide specified functionality. Examples include desktop computers, laptop computers, tablet computers, server computers, multiprocessor systems, microprocessor-based systems, network PCs, minicomputers, and mainframe computers. Additional examples include programmable consumer electronics, appliances, especially so-called "smart" appliances such as televisions. Still other examples include devices that are wearable on the person of a user or carried by a user, such as cellphones, personal digital assistants (PDAs), smart watches, voice recorders, portable media players, handheld gaming consoles, navigation devices, physical activity trackers, and cameras. Yet another non-limiting example is a distributed computing environment that includes any of the above types of computers or devices, and/or the like.

The term "example" and the phrases "for example" and "such as" are to be understood to refer to non-limiting examples. Also, any example otherwise proffered in this detailed description are both intended and to be understood to be non-limiting.

The term "data" is both contemplated and to be understood to encompass both the singular and plural forms and uses.

The term "processor" is both contemplated and to be understood to encompass silicon-based hardware processors configured to execute one or more machine executable instructions or pieces of software, firmware, or a combination thereof so as to provide a specified functionality.

The terms "computer program medium," "storage media," "computer-readable medium," and "computer-readable storage medium," as used herein, are both contemplated and to be understood to encompass memory devices or storage structures such as hard disks/hard disk drives, removable magnetic disks, removable optical disks, as well as other memory devices or storage structures such as flash memory cards, digital video disks, random access memories (RAMs), read only memories (ROM), and the like. Such computer-readable storage media are distinguished from and non-overlapping with communication media (do not include communication media).

The term "cloud" is both contemplated and to be understood to encompass a system that includes a collection of computing devices, which may be located centrally or distributed, that provide cloud-based services to various types of users and devices connected via a network, such as the Internet.

The Internet enables ever increasing opportunities to exchange information. Indeed, the amount of information available by way of the World Wide Web has and continues to grow exponentially.

Complications resulting from this growth are presenting new challenges for search engines and users alike. Search engines, for example, face the challenge of parsing through the available information to identify relevant search results to return in response to a search query. Users, for example, face the difficulty of managing their information needs by, for example, composing succinct and precise queries to accurately represent those information needs.

To reduce the burden on users to generate succinct search queries, search engines have been configured to employ various strategies to provide relevant search results. One strategy has been to enable search engines to use deductive reasoning. This approach relies on data graphs that store data and rules that describe knowledge about the data. These data graphs can be bipartite, meaning that the nodes in the graph can be divided into two disjoint sets, with all edges going between the two sets. Bipartite graphs can be generated for use in web usage mining, which extracts implicit knowledge from data that captures user interactions with the web.

One tool for identifying and exploiting the relationships between nodes connected in a graph is clustering. In such clustering, pairwise connection between two nodes indicates a similarity or affinity between them. Conversely, pairwise disconnection represents a dissimilarity. A goal of graph clustering is to partition the nodes into clusters in which the nodes within the same cluster have more connections than those in other clusters. These relationships can serve as the basis for recommended search queries and/or improved search results.

But, these bipartite graphs are increasingly very large. Such large graphs may include billions of nodes, which makes identifying related nodes challenging. Also, these bipartite graphs may be very lopsided, with one set of nodes several orders of magnitude smaller than the other. Both of these conditions can make graph processing difficult.

Thus, there is a growing need to improve the relevance of items retrieved by information retrieval systems such as web search systems. In addition, there is a need to achieve this in a fast and computationally efficient manner.

In contrast to conventional graph processing, the innovations described herein relate to graph processing that is distributed, hierarchical, and iterative. These aspects, alone and/or in combination, which is synergistic, provide processing that is suitable for large bipartite graphs, even if lopsided.

Although the present examples are described and illustrated herein as being implemented in a web search system, this described context is provided as an example and not a limitation. As those skilled in the art will appreciate, the present examples are suitable for application in a variety of different types of information retrieval systems and graphs. Indeed, large data graphs are not limited to the Internet. For example, social networks and biological networks, such as protein interaction networks, are of sizes that make them candidates for the processing of this invention.

II. Illustrative Distributed Computing System

Figure 1:
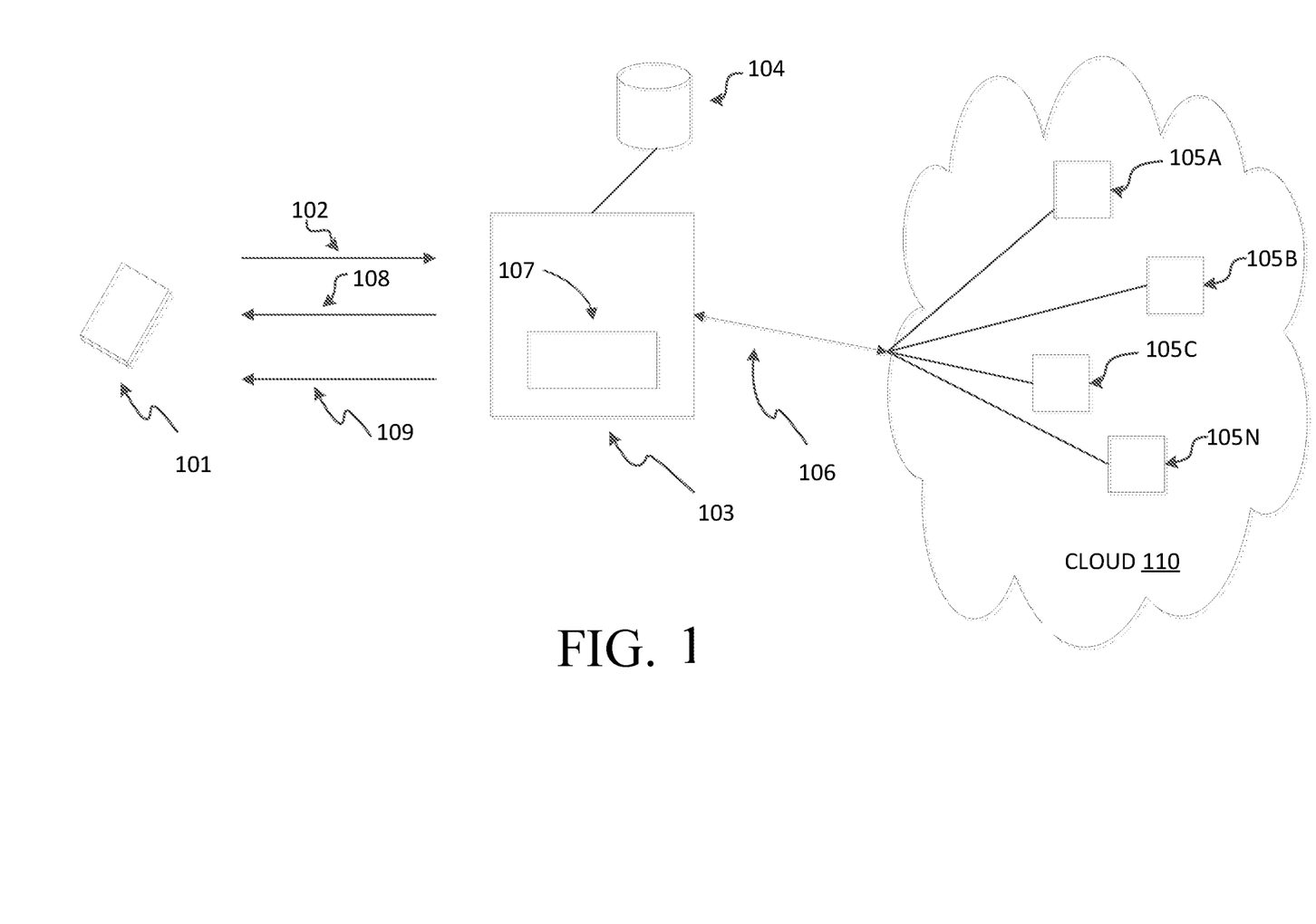
FIG. 1 is a simplified block diagram illustrating an example of a distributed system that implements distributed, hierarchical and iterative graph processing in a manner that is consistent with one or more embodiments of the present invention.

FIG. 1 illustrates an example of a distributed system 100 that implements large bipartite graph processing in a manner that is consistent with one or more embodiments of the present invention. Thus, the system 100 may be used to process large and/or lopsided bipartite data graphs, such as query-URL graphs.

As shown in FIG. 1, the system 100 includes a local computing machine 101 that is in communication with an information retrieval system 103. The information retrieval system 103, in turn, is in communication with data store 104 and a plurality of computing machines 105A, 105B, 105C, . . . 105N. As will be explained in detail below, the plurality of computing machines 105A-105N are disposed within a cloud infrastructure 110 that is connected to the information retrieval system 103 via connection 106.

The local computing machine 101 receives a search query (i.e., input) 102 from a user (not shown), which is conveyed to the information retrieval system 103. Also, as will be explained below, the local computing machine 101 receives search suggestions 108 and search results 109 from the information retrieval system 103, the latter being part of a functionality of a search engine 107 of the information retrieval system.

In the system of FIG. 1, the local processing machine 101 is illustrated as a tablet, such as a SURFACE® tablet by Microsoft Corporation. It is to be appreciated, however, that this selection is for simplicity of explanation only. Other types of computing devices are both possible and contemplated, as explained below.

The information retrieval system 103 may be a single computing device as illustrated in FIG. 1 or an amalgam of plural processing machines. For example, the information retrieval system 103 may be a standard server, a group of such servers, a client-server system, or a rack server system. It is to be appreciated, however, that the information retrieval system 103 may also be implemented by a general computing device, a tablet computing device, a mobile computing device, a wearable computing device, or a "smart" appliance.

The information retrieval system 103 provides search engine functionality via search engine 107. In this example, the search engine may be of any suitable type arranged to rank documents from the database on the basis of the relevance of those documents to user input search terms (e.g., search query 102).

By way of a non-limiting example, the search engine may be arranged to analyze user search terms and generate a rank or weighting for documents on the basis of user input search terms. The search engine may then provide an ordered list of the documents (or links to the documents) based on the ranking. The search engine may be arranged to retrieve a ranked list of documents and query-document pair records, both of which may be stored in data store 104 or elsewhere. It is to be appreciated, however, that other examples include a desktop search engine, media search engine or other appropriate search engine. Non-limiting examples of such functionality are found in the INTERNET EXPLORER® and EDGE® search engines by Microsoft Corporation.

The information retrieval system 103 is in communication with a plurality of individual computing machines 105A-105N, which collectively comprise a cloud infrastructure 110 that is connected to the information retrieval system 103 via the connection 106. This illustrated configuration allows the computing machines 105A-105N them to access information from or communicate with the information retrieval system 103, as well as each other, and vice versa.

By way of example, the cloud infrastructure 110 may be realized via a cloud computing platform such as the AZURE® cloud computing platform by Microsoft Corporation. This type of platform, generally, provides computing resources to one or more users as a service (as opposed to a physical product).

The inventors have found that employing a cloud arrangement may be particularly advantageous because it is both easily scalable to include more processing machines (e.g. 105A-105N), which promotes distributed graph processing. In more detail, the more processing machines 105A, 105B, 105C, . . . 105N that are connected to the information retrieval system 103, the greater the overall processing and storage capability available to receive and process partitions of a graph. The cloud thus facilitates and often promotes the interconnection of great numbers of processing machines 105A, 105B, 105C, . . . 105N.

It is to be appreciated that the cloud infrastructure 110 is but one example of a way to connect one or more of the plurality of processing machines 105A, 105B, 105C, . . . 105N to the information retrieval system 103. Other connection options are both contemplated and possible. So, for example, one or more of the plurality machines 105A, 105B, 105C, . . . 105N may be directly connected to the information retrieval system 103 to provide a direct or indirect avenue of communication between those machine(s) and the server. The connection 106 may comprise, for example, Local Area Networks (LAN), Wide Area Networks (WAN), Public Switched Telephone Networks (PSTN), the Internet and Virtual Private Networks (VPN). Also, the communications network may be public or private and wired or wireless.

It is to be appreciated that each of the machines 101, 103, and 105A-105N is a processor-based electronic device that is capable of executing processing instructions. It is to be appreciated that many types of computing devices are both contemplated and possible. Non-limiting examples of the computing machines include a general computing device, a tablet computing device, a mobile computing device, a wearable computing device, and a "smart" appliance. Furthermore, it is to be understood that these machines may include computing devices of a variety of other general purpose or special purpose computing hardware configurations, such as media devices that provide digital assistant functionality. A non-limiting example of this digital assistant functionality is the CORTANA® digital assistant by Microsoft Corporation.

A non-limiting example of an operational flow of the system 100 is discussed.

After a user inputs a search query or a partial search query into machine 101, the system 100 seeks to provide one or more query recommendations. To that end, the information retrieval system 103 operates on the query-URL graph by: (1) partitioning (i.e., dividing) the graph into first order partitions (i.e., subgraphs); (2) clusters the nodes of the first order partitions; and (3) generating a set of keys for each cluster and encoding each cluster with a hash. Then, the information retrieval system 103 distributes or causes the distribution of the sets of keys and hashes to a plurality of processing machines 105A-105N, which enables parallel processing by the processing machines. Specifically, the processing machines 105A-105N recreate the first order partitions and the bipartite graph, based on the keys.

After the recreation of the first order partitions and the bipartite graphs, the process continues to arrive at second order partitions. In more detail, the processing machines 105A-105N: (1) partition (i.e., dividing) the recreated graph into second order partitions (i.e., subgraphs); (2) cluster the nodes of the second order partitions; and (3) generating a set of keys for each cluster and encoding each cluster with a hash. Then, the processing machines 105A-105N recreate the second order partitions. Thereafter, the information retrieval system 103 merges the recreated second partitions using a hierarchical merge process to yield a recreated bipartite graph.

Continuing, query similarities may be determined using similarities mined from the recreated bipartite graph and delivered to the user for consideration.

Additionally and/or alternatively, the process can be repeated to yield partitioning of orders higher than the second order. Specifically, the processing machines 105A-105N repeat the process of the preceding paragraph. With each iteration, nodes of greater trust are produced, which promotes better identification of similarities within the bipartite graph. Better detection of similarities between nodes of a graph, in turn, promotes formulations of improved search queries, search query suggestions, and/or improved search results.

In an alternative workflow, the processing of the graph can be independent of the receipt of a search query. Stated differently, the graph processing and data mining can be performed before, during and/or after receipt of the search query 102. In this regard, the inventors have discovered that graph processing independently from the receipt of a search query can be most advantageous. For example, this approach enables iterative data mining and promotes data collection on a rolling basis instead of batch collection.

Additionally and/or alternatively, all of the machines (i.e., the information retrieval system 103 and the processing machines 105A-105N) may produce second and higher order partitions. Stated differently, the information retrieval system 103 may assume a role similar to that of one of the processing machines 105A-105N.

III. Exemplary Computing-Based Device

Figure 2:
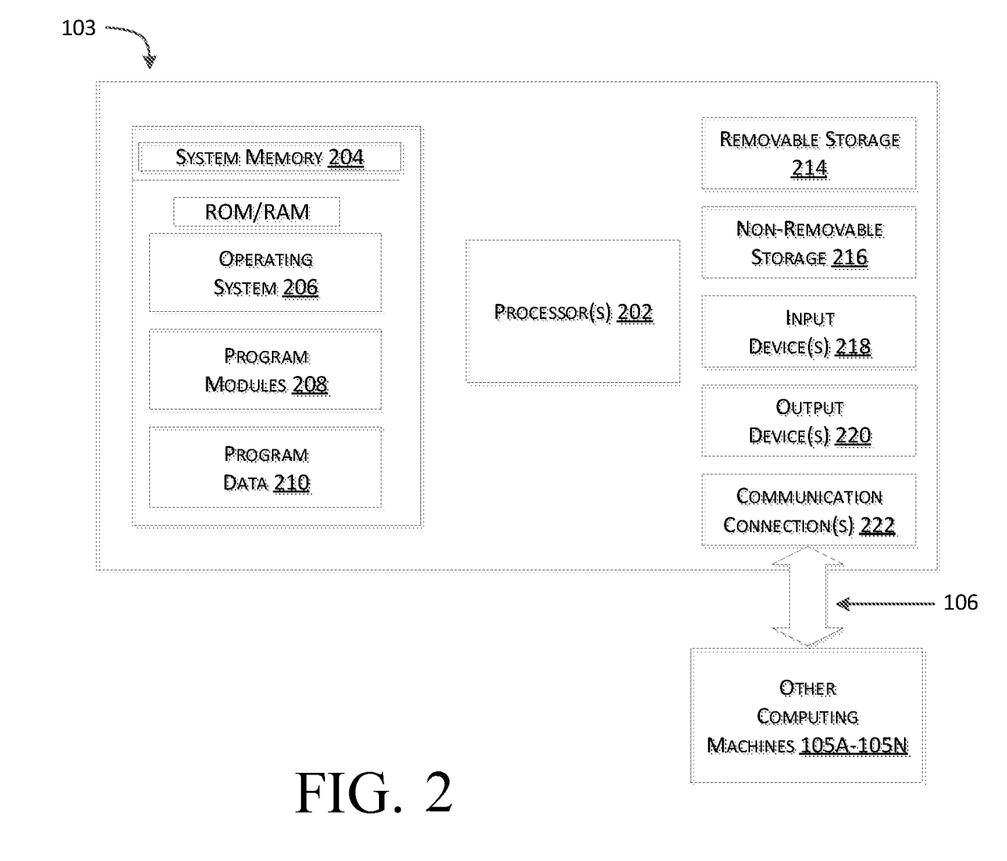
FIG. 2 is a simplified block diagram illustrating an example configuration of the information retrieval system of FIG. 1.

Referring now to FIG. 2, there is illustrated a representative example of the information retrieval system 103 of the system of FIG. 1. It is to be appreciated that the system 103 is a processing machine, which may be the same, similar, or dissimilar to any of the processing machines 105A-105N. Also, the machine of FIG. 2 is one example of a computing machine and is not intended to suggest any limitation as to the scope of use or functionality of any computing device utilized to perform the processes and/or procedures described above.

The system 103 includes at least one processor 202 and system memory 204. The processor(s) 202 may execute one or more modules and/or processes to cause the processing machine 105A to perform a variety of functions. In some embodiments, the processor(s) 202 are a CPU, a GPU, both CPU and GPU, or other processing units or components known in the art. Additionally, each of the processor(s) 202 may possess its own local memory, which also may store program modules, program data, and/or one or more operating systems.

Depending on the exact configuration and type of the system 103, the system memory 204 may be volatile (such as RAM), non-volatile (such as ROM, flash memory, miniature hard drive, memory card, or the like) or some combination thereof. The system memory 204 may include an operating system 206, one or more program modules 208, and may include program data 210.

The program modules 208 may include one or more modules for graph dividing/partitioning, key and hash distribution, and hierarchal merging of recreated graph partitions.

With continued reference to FIG. 2, the system 103 may have additional features and/or functionality. For example, the system 103 may also include additional data storage devices (removable and/or non-removable) such as, for example, magnetic disks, optical disks, or tape. Such additional storage is illustrated in FIG. 2 by removable storage 214 and non-removable storage 216. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 204, the removable storage 214 and the non-removable storage 216 are all examples of computer storage media. Moreover, the computer-readable media may include computer-executable instructions that, when executed by the processor(s) 202, perform various functions and/or operations described herein.

The system 103 may also have input device(s) 218 such as a keyboard, a mouse, a pen, a voice input device, a touch input device, etc. Output device(s) 220, such as a display, speakers, a printer, etc. may also be included.

The system 103 may also contain communication connection 222 that allows the system 103 to communicate with other computing devices, such as processing machines 105A-105N, over a network. These networks may include wired networks as well as wireless networks.

It is to be appreciated that the illustrated information retrieval system 103 is but one example of a suitable device and is not intended to suggest any limitation as to the scope of use or functionality of the various embodiments described. Other computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

IV. Illustrative Bipartite Graph

Figure 3:
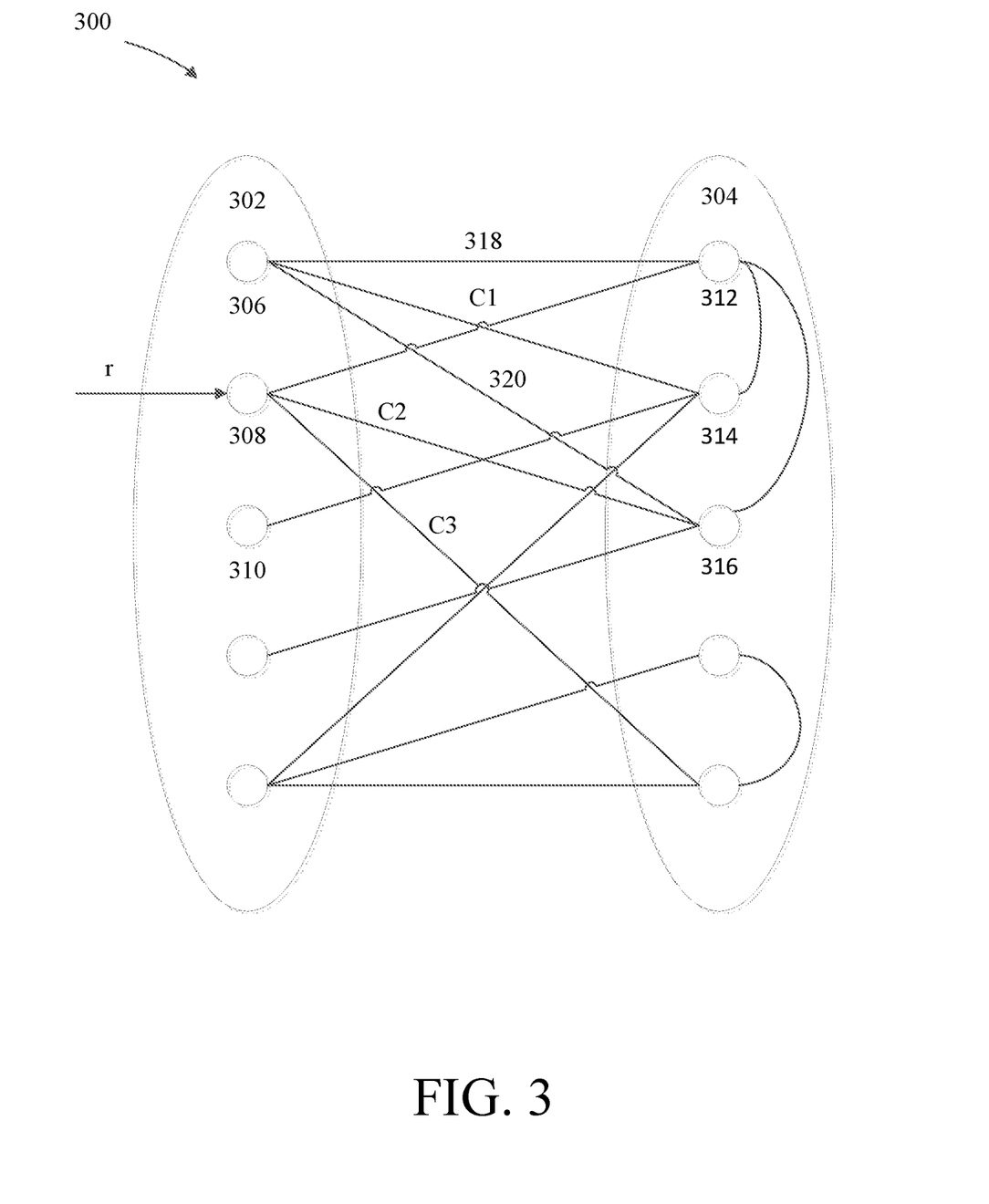
FIG. 3 illustrates an example of bipartite query-Uniform Resource Locator (URL) graph.

Referring now to FIG. 3, an example bipartite graph 300 is illustrated. Generally, a bipartite graph is characterized by nodes divided into two separate groups such that every edge either connects a node from the first set to one in the second set or vice versa. As a result of these characteristics, no edge connects nodes of a same set.

The graph 300 includes a first set of nodes 302 that represent queries submitted by users and a second set of nodes 304 that represent URLs (search results) selected by users when the queries represented by the first set of nodes 302 were submitted to a search engine. An edge exists between a node in the first set of nodes 302 and a node in the second set of nodes 304 if a user clicked on a URL represented by the node in the second set of nodes 304 when the user submitted a query represented by the node in the first set of nodes 302. As explained above, it is to be appreciated that while nodes in the first set are labeled query nodes and nodes in the second set are labeled URL nodes, this is for ease of discussion only. Indeed, the present invention is applicable to graphs of other information, including other types of bipartite graphs.

In this illustrated example, the first set of nodes 302 includes a first node 306, a second node 308, and an Nth node 310, which may respectively represent a first query, a second query and an Nth query made by one or more users. A second set of nodes 304 can include a first node 312, a second node 314 and an Mth node 316, which may respectively represent a first URL, a second URL and an Mth URL.

In the example graph 300, an edge 318 couples the node 306 and the node 312. Thus, this edge represents a similarity between those nodes. Additionally, an edge 320 couples the node 306 with the Mth node 316. Thus, this edge represents a similarity between those nodes.

With continued reference to FIG. 3, computing a query-query similarity using the bipartite graph 300 is discussed. For a query $q_i$ with 'r' impressions, and a connected URL $u_j$ with '$c_{ij}$' impressions, the fraction of the Query-URL pair is computed as:

$$f_{ij} = \frac{c_{ij}}{d_i \cdot r_i} \quad [1]$$

where $d_i$ is the degree of query node $q_i$. Moreover, for a query node $q_i$, with degree $d_{i,\,then}$:

$$\frac{1}{d_i \cdot r_i} \sum_{u_j \in N(q_i)} c_{ij} = 1 \quad [2]$$

where (1) $c_{ij}$ is the impression count of edge $q_i$-$u_j$ and (2) $N(q_i)$ is set of all URLs connected with node $q_i$. For a pair of queries, $q_i$, $q_j$, the similarity between them is computed as:

$$S_{ij} = \sum_{u_k \in (N(q_i) \cap N(q_j))} \min(f_{ik}, f_{jk}) \quad [3]$$

So, for a pair of queries $q_i$, $q_j$, $$0 \leq S_{ij} \leq 1 \quad [4]$$

Thus, queries with $S_{ij} > T$ have an edge in the induced query-query graph. T=0.

With continued reference to FIG. 3, identifying clusters of related queries is discussed.

A cluster's "goodness" is calculated by the following expression:

$$\frac{\sum_{\forall i,j \in C} S_{ij}}{n \times (n-1)/2} \quad [5]$$

where n is the size of a cluster or "concept" C. This "goodness" measure, in turn, is used to determine if the cluster should be preserved or broken when the cluster is processed. In more detail, the "goodness" is compared to a threshold and is a measure of confidence in a cluster. When the "goodness" exceeds the threshold, the cluster is preserved, regardless of the size. Conversely, when the "goodness" does not exceed the threshold, the cluster is broken. Thus, edges are dropped when correlation rates are low.

A maximum size threshold determination may be introduced in this cluster processing. In more detail, when a cluster or "concept" exceeds a maximum size, the concept is broken.

Figure 4A:
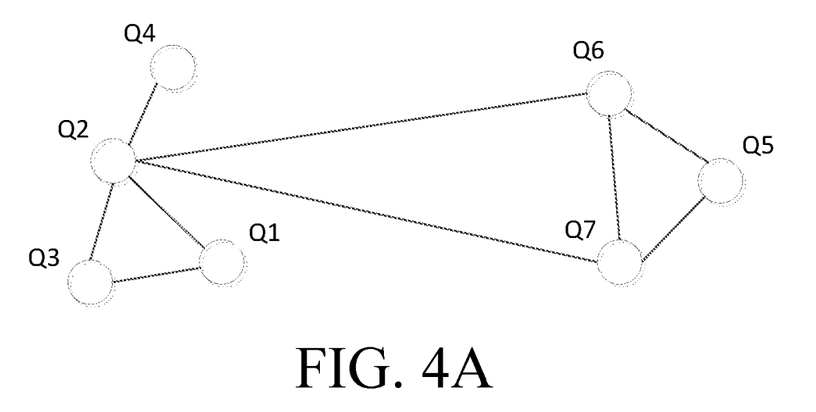
FIGS. 4A and 4B illustrate query-query graphs with FIG. 4A illustrating a query-query graph based on the URLs of the graph of FIG. 3 and FIG. 4B illustrating the query-query graph of FIG. 4A with some edges not used in cluster processing removed.

Referring now to FIG. 4A, there is illustrated an example of a query-query (Q-Q) graph (i.e., all nodes are queries) that has been induced (produced) based on the shared URLs of the bipartite graph 300 of FIG. 3. Here, it is to be appreciated that other types of data graphs are possible and that when graph 300 of FIG. 3 is not a Query-URL graph, the graph of FIG. 4 would not be a Q-Q graph. Still, the graph of FIG. 4A would consist of all of the same type of nodes (i.e., the nodes would represent the same type of data).

The Q-Q graph of FIG. 4A represents the connections between different queries of FIG. 3 and is usable to form and/or identify dense query clusters.

In more detail, in Query-URL graph 300 of FIG. 3, there is/are no direct edge(s) between queries. However, if two queries are similar, they must share at least one (and probably many) URLs. The greater the number of URLs shared by two queries, the stronger the relationship is between those two queries. This relationship is captured (i.e., reflected) in the query-URL graph, but may not be apparent, but is more apparent in the Q-Q graph of FIG. 4A. So, not all of the query nodes in the Query-URL graph 300 of FIG. 3 are present in Q-Q graph of FIG. 4A.

Additionally, the weight of an edge between queries (query nodes) is proportional to number of URLs that they share, as reflected by FIG. 3. Further, one exemplary way to compute the weight is explained above by expressions [1]-[5] above.

Still further, it is to be appreciated that the greater the number of connections between two query nodes in a Query-URL graph (e.g., the graph 300 of FIG. 3), the higher the weight between them.

The use of the Q-Q graph of FIG. 4A is discussed.

The Query-Query graph is partitioned into cluster(s), as explained below with reference to FIG. 5. Also, the Query-URL graph can be returned for each partition from the original Query-URL graph based on all the edges for each query node in a partition from the Query-URL graph. Also, getting back a Query-URL graph is useful, as keys for a partition are generated with the help of this Query-URL graph, as explained below with reference to FIG. 5.

Additionally and/or alternatively, every time a new batch of data arrives, Query-Query graph(s) can be produced from Query-URL graph(s), by partitioning and storing each partition as a Query-URL graph. This is how the present invention processes a large data graph incrementally. As more data arrives, the process is repeated. So, there are oscillations back and forth between Q-Q graphs (e.g., the graph of FIG. 4A) and Query-URL graphs (e.g., graph 300 of FIG. 3).

Figure 4B:
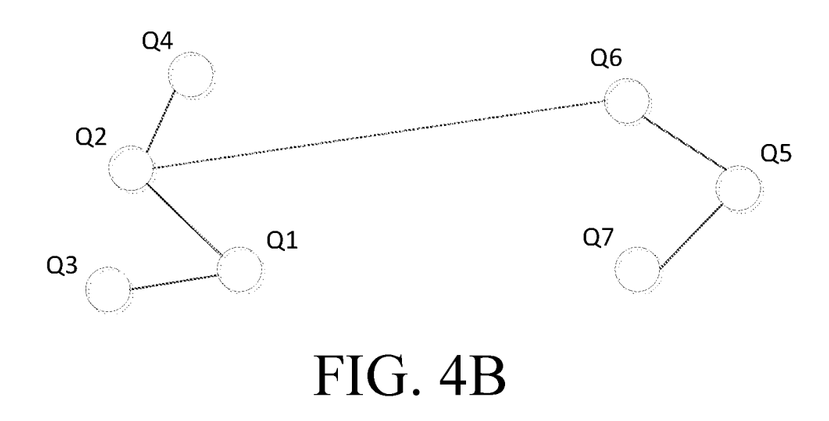

Referring now to FIG. 4B, there is illustrated the query-query graph of FIG. 4A, with edges that are not used in clustering removed.

Over large graphs, holding an entire Q-Q graph, like that of FIG. 4A, in memory is difficult because it can exceed storage space. This is the case even for many partitioned Query-URL graphs. The inventors have discovered a strategy that includes, while inducing a Q-Q graph, we proactively determining that certain edges are redundant and are not be required by a clustering algorithm. In more detail, after pro-actively identifying such edges, they may be "dropped," which can result in up to 99% reduction in the number of edges, without impacting the accuracy of clustering. Therefore, instead of inducing Q-Q graph shown in FIG. 4A, the strategy induces Q-Q graph as shown in FIG. 4B.

VI. Illustrative Method of Graph Processing

Figure 5:
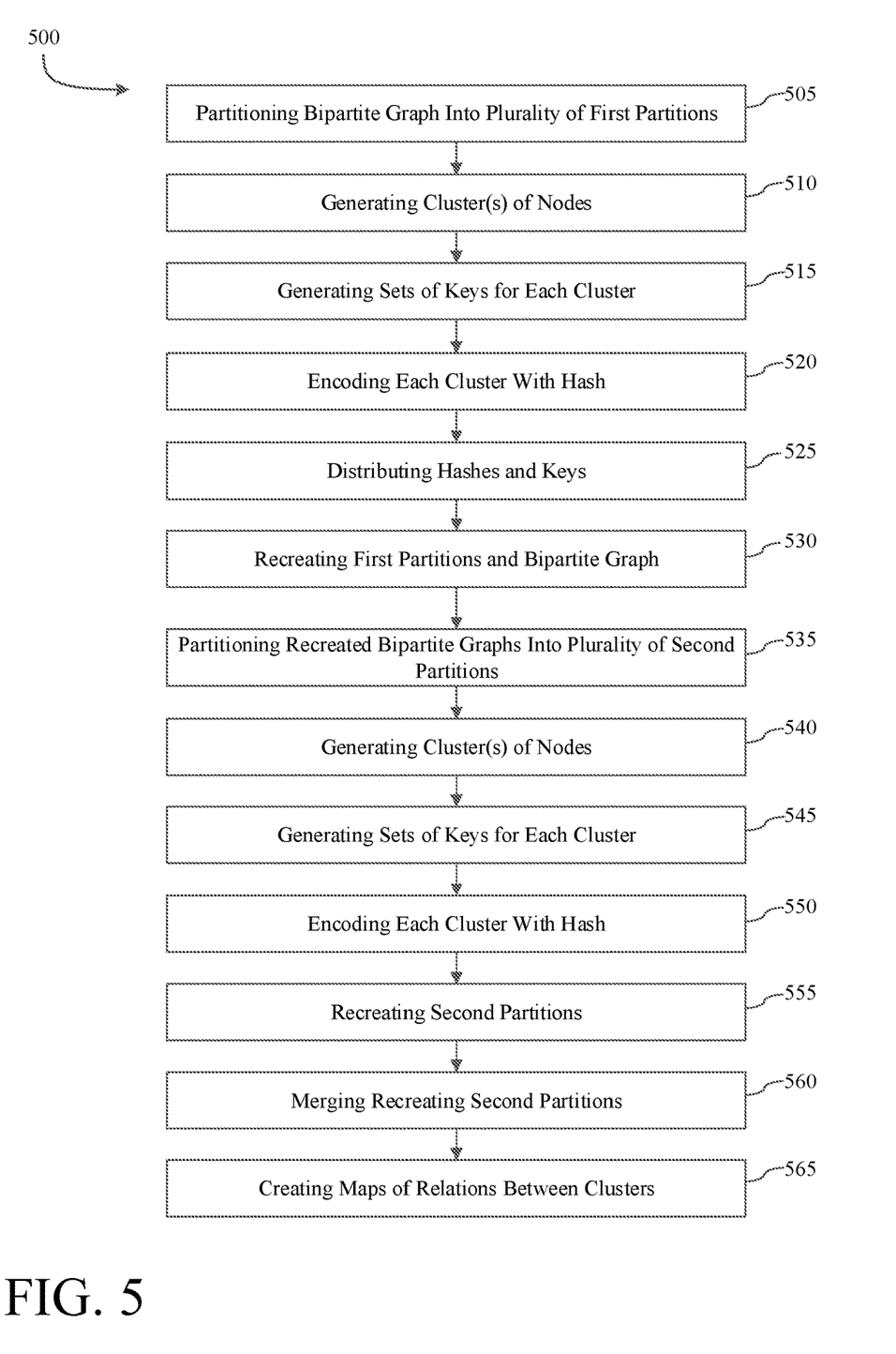
FIG. 5 is a flowchart illustrating a method of processing a bipartite graph in a distributed, hierarchical and iterative manner that is consistent with one or more embodiments of the present invention.

Referring now to FIG. 5, there is illustrated a method 500 of processing a data graph. The method 500 is performable to process a graph of a plurality of nodes (e.g., a large bipartite graph) to facilitate data mining of similarities between the nodes. The method 500 may be performed, for example, by the system 100 of FIG. 1 on the bipartite query-URL graph 300 of FIG. 3.

At operation 505, the bipartite graph is partitioned into a plurality of first partitions. It can be useful to consider these partitions to be of a first order. As will be explained below, dividing the graph into multiple parts permits separate yet parallel processing of the parts. Stated differently, partitioning the graph permits the distribution of the computational costs and enables parallel processing.

The inventors have discovered that the sizes of the first partitions may be selected based on any number of relevant factors. Examples of the factors include: a frequency at which data is collected (e.g., an hour or a day); an amount of information collected over a specified time; and a threshold upper limit that is believed to be successfully processed by the processing machines that will receive them (e.g., processing machines 105A-105N). Thus, sizes of the first partitions may be based on time-based factors, size-based factors, processing capabilities, and/or memory capacities, for example a number of queries per hour.

Some or all of the first partitions may share the same size. In this regard, the inventors have found that partitioning a graph into equal partitions can be particularly advantageous because it promotes load balancing (i.e., equal load distribution for parallel processing by processing machines such as machines 105A-105N).

Also, the inventors have determined that it can be advantageous to size the first partitions to be smaller than the expected processing capabilities and memory capacities of the machines that will be processing the data graph. In more detail, extracting knowledge by performing computations on graphs is increasingly challenging as graphs grow in size. To this end, the process may employ a partitioning algorithm that seeks to identify a "core graph" of the induced Query-Query graph and then to adjust that "core graph" to arrive at a "final core graph" for processing. This process is repeated multiple times until the entire Query-Query graph is partitioned into the desired size.

At operation 510, one or more clusters of the nodes of each first partition is generated. By way of review, non-uniform data contains underlying structure due to the heterogeneity of the data. The objective of this clustering is to identify sets of "related" nodes is the graph by grouping the nodes of the graph into clusters taking into consideration the edge structure of the graph in such a way that there should be many edges within each cluster. Clustering identifies this structure by grouping nodes based on some similarity measure defined for the data. In a query-URL graph, these clusters can reflect related queries.

Next, at operation 515, a set of keys is generated for each cluster of nodes. Here, each key may be based on similarities between the nodes of the cluster for which the key was generated. So, when the bipartite graph is a query-URL graph such as the graph illustrated in FIG. 3, for example, the keys are based on shared/common URLS represented by the nodes of the graph.

At operation 520, each cluster of nodes is encoded with a hash. These respective hashes may be names of the clusters to which they correspond. Alternatively, these hashes may be codes or even nicknames.

At operation 525, the hashes and the keys are distributed to respective processing machines such as, for example, the processing machines 105A-105N of FIG. 1. This distribution is based on the sets of keys generated in operation 515.

In this distributing, the hashes and keys may be distributed to maximize uniformity of load balancing based on, for example, one or more of processing capacities of the processing machines, storage capacities of the processing machines, processing speeds of the processing machines, bandwidths of the processing machines, and bandwidth of a network connecting the processing machines.

Clusters may share one or more keys. Also, clusters sharing one or more keys may arrive at the same machine. In that circumstance, a re-partitioning operation is performed so as to avoid redundant processing. This re-partitioning removes redundant key(s). A result of the repartitioning is that a size of a recreated bipartite graph is smaller than the original or prior graph because there are fewer duplications.

Then, at operation 530, the processing machines such as, for example, the processing machines 105A-105N recreate both the first partitions, based on received hashes and keys of the clusters of the first partitions. The machines also recreate the bipartite graph.

At operation 535, at the processing machines, the respective recreated bipartite graphs are partitioned into second partitions. It can be useful to consider these partitions to be of a second order.

The inventors have discovered that the sizes of the second partitions, like the first partitions, may be selected based on any number of relevant factors. Examples of the factors include: a frequency at which data is collected (e.g., an hour or a day); an amount of information collected over a specified time; and a threshold upper limit that is believed to be successfully processed by the processing machines (e.g., processing machines 105A-105N). Thus, sizes of the second partitions may be based on time-based factors, size-based factors, processing capabilities, and/or memory capacities.

Some or all of the second partitions, like the first partitions, may share the same size. In this regard, the inventors have found that partitions of equal partitions can be particularly advantageous because it promotes load balancing (i.e., equal load distribution for parallel processing by processing machines such as machines 105A-105N).

Also, the inventors have determined that it can be advantageous to size the second partitions to be smaller than the expected processing capabilities and memory capacities of the machines that will be processing the data graph.

In more detail, extracting knowledge by performing computations on graphs is increasingly challenging as graphs grow in size. Here, the present invention excels.

It is to be appreciated that each node in the second order partitions corresponds to a hash code of a node cluster generated in operation 510, after the first order partitioning. Thus, a node in the second order graphing represents a cluster. This representation of clusters as nodes promotes compression, which permits the processing of even large data graphs. In more detail, the representation of clusters of a lower order iteration as nodes in a higher order iteration promotes the compression.

It is also to be appreciated that the nodes of the second partitions (i.e., second order nodes) are more trustworthy than those of the first partitions (i.e., first order nodes). So, it can be useful to consider the "second order" nodes, since they follow a graph recreation operation, as "supernodes."

Still further, it is to be appreciated that higher order nodes, such as third order nodes that follow a third partitioning, are more trustworthy than those of the second partitions, and so on. This increasing trustworthiness is a particularly novel aspect of the iterative graph processing of the present invention.

At operation 540, one or more clusters of nodes of each second partition is generated.

Next, at operation 545, a set of keys is generated for each cluster of nodes of each second partition. Here, each key may be based on similarities between the nodes of the cluster for which the key was generated. So, when the bipartite graph is a query-URL graph such as the graph illustrated in FIG. 3, for example, the keys are based on shared/common URLS represented by the nodes of the graph.

At operation 550, each cluster of nodes is encoded with a hash. These respective hashes may be names of the clusters to which they correspond. Alternatively, these hashes may be codes or even nicknames.

At operation 555, each processing machine recreates the second partitions, based on the hashes and keys of the clusters of the second partitions.

At operation 560, the recreated second partitions are merged to yield a recreated bipartite graph. This merge may be realized using a hierarchical merge process.

One result of the method 500 is that when the graph is updated with new nodes and edges, only the clusters impacted by the change(s) are updated. This incremental updating permits the processing of dynamic graphs and in particular, dynamic bipartite graphs of any size.

This process 500 may be partially repeated to generate graph partitions of higher orders, based on hashes and keys. So, for example, when a third level partition is called for, a third level graph is constructed with hashes (i.e., hash codes) and keys of the second level partitions/clusters. Here, it is to be appreciated that this iterative processing can continue for ever higher orders.

Ultimately, maps of the relationships between the clusters can be created (block 565). These maps reveal structures in the heterogeneous data of the graph. This map may take any number of forms. For example, the map may be a key-value pair in which the cluster or "concept" is the key and the list of clusters are the value.

So, a concept has an associated "list of concepts" that is kept in sorted order, with close concepts appearing earlier in the list. Also, whenever a concept is broken, the result is two broken concepts that are closest to each other.

VII. Exemplary Searching

Figure 6:
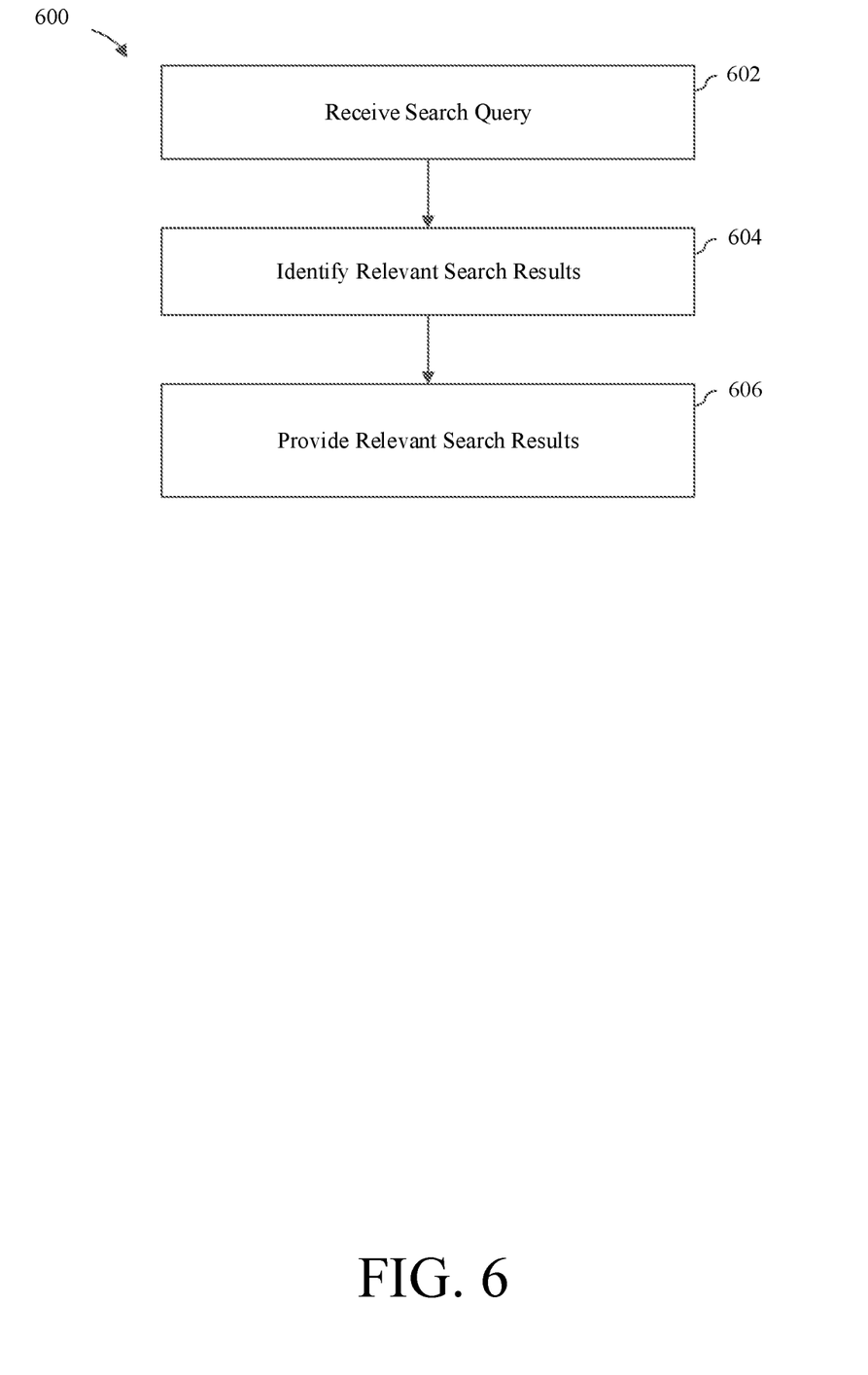
FIG. 6 is a flowchart illustrating a method of providing search results in response to search query utilizing data mined from a recreated bipartite graph of method of FIG. 5.

Referring now to FIG. 6, there is illustrated a flowchart a process 600 of generating search results based on a received search query.

At block 602 a query is received. This query may, for example, correspond to search query 102 of FIG. 1. Also, this query may be sent from a user of local computing machine 101 of FIG. 1. Moreover, the query may be received by information retrieval system 103 of FIG. 1. The query may include one or more terms and may have a search intent relating to identifying a particular type of information. For instance, the query may include the term "pizza recipe" and, therefore, may be requesting information about how to make various types of pizza.

At block 604, information corresponding to the search query is retrieved. In more detail, entities of the search query are identified. Then, for example, the information retrieval system 103 of FIG. 1 may retrieve information based on data mined from the merged bipartite graph resulting from the graph processing of the present invention, such as the process depicted in FIG. 5.

An entity is, in a general sense, a description of some sort of real word object or item. That is, an entity is a representation of a real-world concept versus a Web document, for example. Entities sharing common attributes may be grouped into entity types.

User queries often contain one or more entities (e.g., a person, location, or organization name) identified by proper name, noun phrases, or properties associated with an entity. For example, one query might search for "George Washington", while another might search for "President of the United States". Both of these queries are looking for information related to a specific entity. Users may also search for locations, such as restaurants, banks, shopping centers, and so forth. Entities may include any type of nameable thing whether it is a business, person, consumer good or service, and so forth.

At block 606, search results are ranked and delivered. These results, for example, may be delivered from the information retrieval system 103 of FIG. 1 to the local computing machine 101 of FIG. 1. To rank these results, the system may use a ranking model, which is based on how responsive results are believed to be to the received search query. This information may correspond to the search results 109, as illustrated in FIG. 1.

VIII. Exemplary Search Query Suggestion

Figure 7:
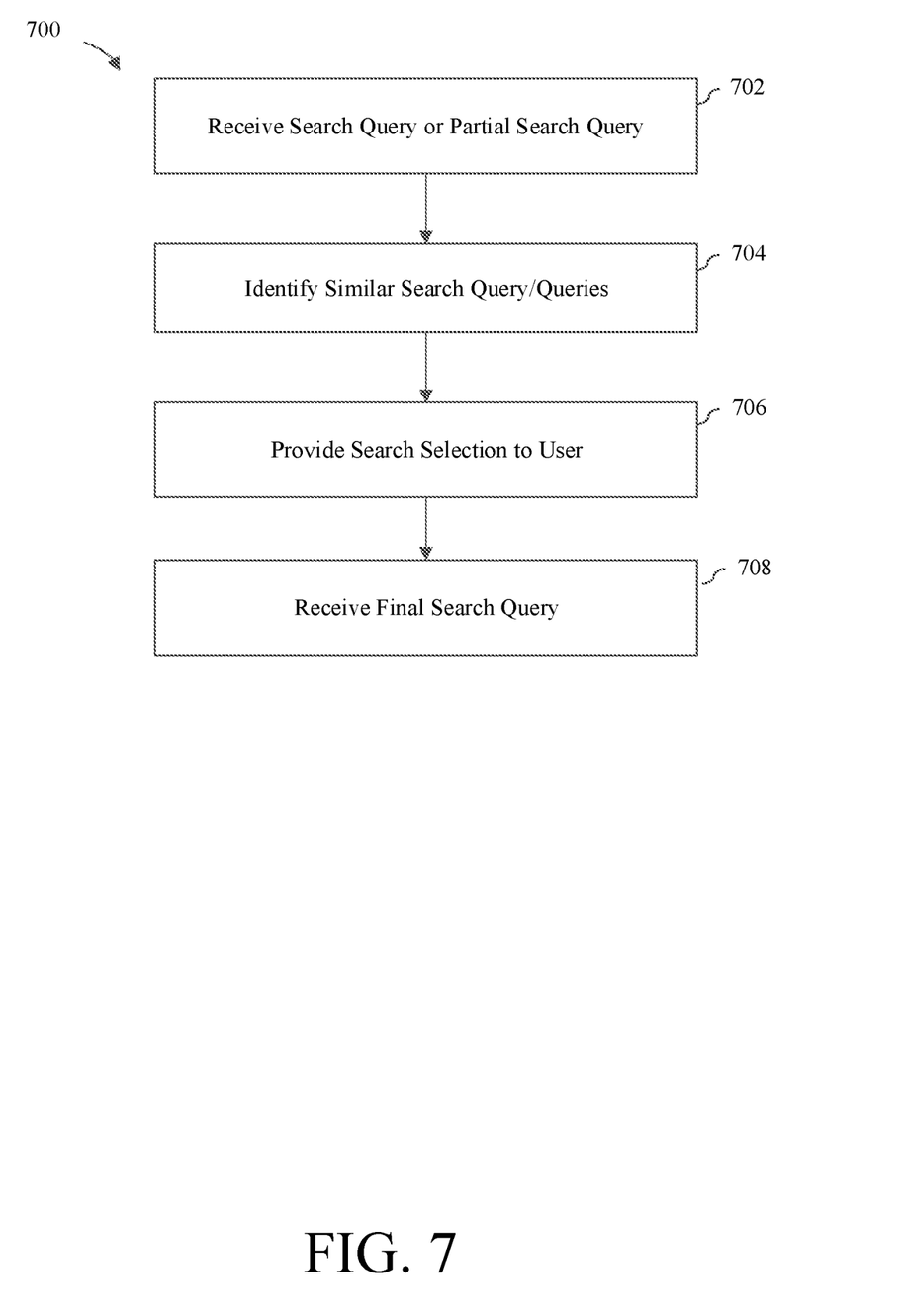
FIG. 7 is a flowchart illustrating a method of providing search query suggestions utilizing data mined from a recreated bipartite graph of method of FIG. 5.

Referring now to FIG. 7, there is illustrated a flowchart a process 700 of providing search query suggestions utilizing data mined from a recreated bipartite graph of the method of FIG. 5.

At block 702 a search query or partial search query is received. This query may, for example, correspond to search query 102 of FIG. 1. Also, this query may be sent from a user of local computing machine 101 of FIG. 1. Moreover, the query may be received by information retrieval system 103 of FIG. 1. The query may include one or more terms and may have a search intent relating to identifying a particular type of information. For instance, the query may include the term "pizza recipe" and, therefore, may be requesting information about how to make various types of pizza.

At block 704, a suggested search query or portion thereof that may complete an input partial search query is generated. In this operation, the information retrieval system 103 of FIG. 1, for example, may leverage the merged bipartite graph resulting from the graph processing of the present invention, such as the process depicted in FIG. 5.

As used herein, the term "suggested search query" refers to a search query that is selected based on a received query portion and provided to the user as a suggestion for performing a search. For example, if a user types "co" in a search box, a list containing "computers," "coffee," and "condos" may be suggested. Additionally and/or alternatively, the submitted portion may produce a list of suggested search queries that begin with different characters as the submitted portion. For example, if a user types "windows" in a search box, a list containing "Microsoft Windows" and "Anderson Windows" may be suggested. In still another example, the suggested search queries include the string from the query portion (i.e., "co") at the beginning or middle of a term; while in other instances, the suggested search queries may be related concepts and terms that don't include the string (e.g., curtain is related to window).

By presenting suggested search queries as the user is entering the search query, the user is relieved of the burden of completely entering the entire search query. Also, the user may be presented with a search query the user prefers over what the user originally intended to enter. The user may select a suggested search query and cause a search to be performed using the selected search query.

At block 706, the suggested search query or portion thereof is provided to the user. This information may correspond to the search results 108, as illustrated in FIG. 1.

At block 708, a final query is retrieved.

IX. Closing

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

It is to be appreciated that one or more embodiments of the present invention may include computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable media include, but are not limited to, memory devices and storage structures such as RAM, hard drives, floppy disks, CD ROMs, DVD ROMs, zip disks, tapes, magnetic storage devices, optical storage devices, MEMs, nanotechnology-based storage devices, and the like.

It is to be appreciated that the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Additionally, consistent with one or more contemplated embodiments of the present invention, the digital personal assistant may use any of a variety of artificial intelligence techniques to improve its performance over time through continued interactions with the user. Accordingly, it is reiterated that the disclosed invention is not limited to any particular computer or type of hardware.

It is also to be appreciated that each component of logic (which also may be called a "module" or "engine" the like) of a system such as the system 100 depicted in FIG. 1 and/or the system 103 depicted in FIG. 2 above, can be implemented using the one or more processing units of one or more computers and one or more computer programs processed by the one or more processing units. A computer program includes computer-executable instructions and/or computer-interpreted instructions, such as program modules, which instructions are processed by one or more processing units in the one or more computers. Generally, such instructions define routines, programs, objects, components, data structures, and so on, that, when processed by a processing unit, instruct the processing unit to perform operations on data or configure the processor or computer to implement various components or data structures. Such components have inputs and outputs by accessing data in storage or memory and storing data in storage or memory.

Further, the inventors reiterate, and it is to be appreciated that systems consistent with contemplated embodiments of the present invention, such as system 100 of FIG. 1, may be practiced in distributed computing environments where operations are performed by multiple computers that are linked through a communications network. In a distributed computing environment, computer programs may be located in local and/or remote storage media.

Still further, it is to be understood that instances of the terms "article of manufacture," "process," "machine," and/or "composition of matter" in any preambles of the appended claims are intended to limit the claims to subject matter deemed to fall within the scope of patentable subject matter defined by the use of these terms in 35 U.S.C. § 101.

As the foregoing illustrates, one or more embodiments described herein advantageously split the data of a large graph and distribute it across a number of machines to permit parallel computation.

As the foregoing illustrates, one or more embodiments described herein advantageously implement a distributed, hierarchical, iterative graph processing strategy that can facilitate large graph processing, as well as data mining thereof.

As the foregoing also illustrates, one or more embodiments of the present invention can significantly improve the accuracy and effectiveness of the conventional query-term based query recommendation systems.

Although selected embodiments of the present invention have been shown and described individually, it is to be understood that at least aspects of the described embodiments may be combined. Also, it is to be understood the present invention is not limited to the described embodiment(s). Instead, it is to be appreciated that changes may be made to the one or more disclosed embodiments without departing from the principles and spirit of the invention, the scope of which is defined by the claims and the equivalents thereof. It should be understood that the subject matter defined in the appended claims is not necessarily limited to the specific implementations described above. The specific implementations described above are disclosed as examples only.

What is claimed is:

1. A method of processing a bipartite graph, the method comprising:
   partitioning a bipartite graph into a plurality of first partitions;
   generating one or more clusters of nodes of each first partition;
   generating a set of keys for each cluster of nodes of each first partition, each key being based on similarities between nodes of the cluster for which the key was generated;
   encoding each cluster of nodes of each first partition with a hash;
   distributing the hashes and the keys to processing machines of a network, based on the keys;
   recreating, at the processing machines, both the first partitions, based on received hashes and keys of the clusters of the first partitions, and the bipartite graph;
   partitioning, at the processing machines, the recreated bipartite graphs into second partitions;
   generating one or more clusters of nodes of each second partition;
   generating a set of keys for each cluster of nodes of each second partition, each key being based on similarities between nodes of the cluster for which the key was generated;
   encoding each cluster of nodes of each second partition with a hash;
   recreating, at the processing machines, the second partitions, based on the hashes and keys of the clusters of the second partitions; and
   merging the recreated second partitions using a hierarchical merge process to yield a recreated bipartite graph.

2. The method of claim 1, further comprising:
   partitioning, at the processing machines, the recreated bipartite graphs into third partitions;
   generating one or more clusters of nodes of each third partition;
   generating a set of keys for each cluster of nodes of each third partition, each key being based on similarities between nodes of the cluster for which the key was generated;
   encoding each cluster of nodes of each second partition with a hash;
   recreating, at the processing machines, the third partitions, based on the hashes and keys of the clusters of the third partitions; and
   merging the recreated third partitions using a hierarchical merge process to yield a recreated bipartite graph.

3. The method of claim 1, wherein the keys are based on shared/common URLS represented by nodes.

4. The method of claim 1, wherein the hashes are names of clusters.

5. The method of claim 1, wherein, in the distributing, hashes and keys are distributed to maximize uniformity of load balancing based on one or more of processing capacities of the computing machines, storage capacities of the processing machines, processing speeds of the computing machines, bandwidths of the processing machines, and bandwidth of the network.

6. The method of claim 1, wherein in the recreating both the second partitions and the bipartite graph comprises removing redundant keys present on a respective one of the processing machines.

7. The method of claim 1, further comprising reducing sizes of at least one of the recreated first partitions and the recreated second partitions by removing redundancies at each processing machine.

8. The method of claim 1, wherein the recreating the bipartite graph includes reducing a size thereof by selectively breaking edges between recreated first partitions present on a respective one of the processing machines to yield cluster sizing appropriate for the respective one of the processing machines.

9. A graph processing method, comprising:
   dividing a bipartite query-URL graph of nodes that include queries and URLs into a plurality of first order subgraphs;
   generating one or more first order clusters for each first order subgraph;
   distributing first order hashes and first order keys for each first order cluster, the first order keys being based on similarities between nodes of the first order cluster, and being generated based on the URLs;
   recreating the first order subgraphs, based on the received first order hashes and first order keys;
   recreating the input graph, based on the recreated first order subgraphs;
   processing a recreated input graph by
      dividing the recreated input graphs to yield next order subgraphs;
      generating one or more second order clusters for each next order subgraph;
      generating a next order key for each next order cluster, the next order keys being based on similarities between nodes of the next order cluster;
      encoding each next order cluster with a hash;
      recreating both the next order subgraphs, based on the next order hashes and next order keys, and the input graph, based on the recreated next order partitions; and
      merging the recreated next partitions using a hierarchical merge process to yield a recreated bipartite graph.

10. The method of claim 9, further comprising identifying similarities between nodes of the recreated bipartite graph resulting from the merging.

11. The method of claim 9, wherein the distributing includes a load balancing operation to maximize uniformity of distribution to a plurality of computing machines.

12. The method of claim 9, further comprising:
   detecting changes to the input graph;
   effecting incremental updates to the first order clusters; and
   effecting incremental updates to next clusters, based on the hashes and the keys.

13. The method of claim 9, further comprising: repeating the processing a recreated graph to yield increasingly higher order partitions.

14. The method of claim 13, further comprising:
   detecting changes to the input graph; and
   effecting incremental updates to the higher order type clusters.

15. The method of claim 13, wherein nodes of higher order recreated graphs are more trustworthy than lower order recreated graphs.

16. A system, comprising:
a first computing machine that
divides an input graph of nodes into a plurality of first order subgraphs,
generates one or more first order clusters for each first order subgraph, and
distributes first order hashes and sets of first order keys for each first order cluster, the first order keys being based on similarities between nodes of the first order cluster; and
a group of one or more second computing machines that
recreate the first order subgraphs, based on the received first order hashes and first order keys distributed from the first computing machine,
recreate the input graph, based on the recreated first order subgraphs,
divide the recreated input graphs to yield second order subgraphs,
generate one or more second order clusters for each second order subgraph,
generate a second order key for each second order cluster, the second order keys being based on similarities between nodes of the second order cluster,
encode each second order cluster with a hash,
recreate both the second order subgraphs, based on the second order hashes and second order keys, and the input graph, based on the recreated second order partitions, and
provide search results in response to a search query utilizing data mined from at least the recreated input graph.

17. The system of claim 16, wherein, when a second computing machine identifies clusters that share one or more sets of keys, that second machine repartitions a recreated graph so that no clusters share a set of keys.

18. The system of claim 16, wherein the group iteratively operate to produce partitions and recreated graphs of higher orders.

19. The system of claim 16, wherein the first computing machine merges partitions recreated by the group using a hierarchical merge process to yield a recreated bipartite graph.

* * * * *